US012769870B2

(12) United States Patent
Nadgire

(10) Patent No.: US 12,769,870 B2
(45) Date of Patent: Oct. 20, 2026

(54) COMPUTING FRAMEWORK FOR ENFORCEMENT OF DATA PRIVACY CONSENT THROUGH DEVICE FINGERPRINTS

(71) Applicant: PAYPAL, INC., San Jose, CA (US)

(72) Inventor: Chetan Nadgire, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 137 days.

(21) Appl. No.: 18/607,979

(22) Filed: Mar. 18, 2024

(65) Prior Publication Data

US 2025/0291950 A1 Sep. 18, 2025

(51) Int. Cl.
*H04L 29/06* (2006.01)
*G06F 21/31* (2013.01)
*G06F 21/62* (2013.01)
*H04L 9/32* (2006.01)

(52) U.S. Cl.
CPC .......... *G06F 21/6245* (2013.01); *G06F 21/31* (2013.01); *H04L 9/3236* (2013.01)

(58) Field of Classification Search
None
See application file for complete search history.

(56) References Cited

U.S. PATENT DOCUMENTS 12,316,610 B1 * 5/2025 Muth .................. H04L 63/0435
2015/0237049 A1 * 8/2015 Grajek .................... H04L 67/02 726/7
2017/0310667 A1 * 10/2017 Correa .................... H04L 63/08
2018/0089676 A1 * 3/2018 Narasimhan ....... G06Q 30/0269
2020/0211080 A1 * 7/2020 Frederick ........... G06Q 30/0251
2021/0044578 A1 * 2/2021 Chan ....................... H04L 63/04
2021/0090109 A1 * 3/2021 Vlahovic .............. H04L 67/535
2021/0200899 A1 * 7/2021 Brannon ............. G06F 21/6245
2022/0247750 A1 * 8/2022 Kaidi .................. G06F 11/3006
2023/0224523 A1 * 7/2023 Hasan .............. H04N 21/25808 709/231
2024/0126925 A1 * 4/2024 Apsingekar ........... H04L 9/0894
2025/0126123 A1 * 4/2025 Betancourt ........... H04L 63/105

* cited by examiner

*Primary Examiner* — Shin-Hon (Eric) Chen
(74) *Attorney, Agent, or Firm* — Haynes and Boone, LLP

(57) ABSTRACT

There are provided systems and methods for a computing framework for enforcement of data privacy consent through device fingerprints. A service provider, including an electronic transaction processor, may provide consent management and enforcement through device fingerprints server-side in place of using device-side cookies or other data. When a device interacts with a service provider and provides or generates user data, the user of the device may opt-in to consenting to share or use that user data for targeted content and/or personalized services. The device may be fingerprinted using unique device parameters and a fingerprinting algorithm to generate a unique device identifier. User segments may then be built for the user based on the user data and to hide or obfuscate the user data. The device fingerprint may then be shared with the user segments so that when the device is further detected, targeted content and personalization may be provided.

20 Claims, 6 Drawing Sheets

| fingerprint_id | Privacy Consent | Expiry |
|---|---|---|
| fchome_12qw34er | Marketing = yes<br>Functional = yes<br>Performance = yes | 10/29/2024 |
| safari_78ty90ui | Marketing = no<br>Functional = yes<br>Performance = yes | 11/30/2023 |

| Campaign | Audience | Expiry |
|---|---|---|
| Meta_001 | <list of fingerprint ids> | 12/30/2023 |
| Google_005 | <list of fingerprint ids> | 02/15/2024 |

COMPUTING FRAMEWORK FOR ENFORCEMENT OF DATA PRIVACY CONSENT THROUGH DEVICE FINGERPRINTS

TECHNICAL FIELD

The present application generally relates to automated data privacy protection and consent for data sharing and more particularly to utilizing device fingerprints to track content authorizations associated with data privacy across multiple online platforms.

BACKGROUND

Service providers may have large computing systems and numerous services that provide automated interfaces and interactions with different end users, such as customers, clients, internal users and teams, and the like. Users may interact with various applications, websites, and/or other digital platforms via computing devices, as well as exchange messages and content via text messaging, emails, push notifications, instant messaging, and other electronic communication channels. This includes providing and/or sharing private data and/or privacy protected data, such as personally identifiable data (PII), know your customer (KYC) data, financial data, and the like that may be privacy protected and/or desirable to remain private or not be shared. However, advertisers and other big data users may want to obtain personal and/or privacy protected data for advertising and business purposes. Further, fraudsters may attempt to compromise sensitive data to access and/or utilize such data for fraudulent purposes, such as to perform fraudulent electronic transaction processing or account takeover. As such, laws, rules, and regulations may govern consent to sharing private data and privacy concerns of users.

Thus, service providers may attempt to provide strong privacy protection, and may be required to comply with laws, regulations, and company rules or objectives governing privacy protection. This may prevent data from being shared without consent. However, users may find it beneficial to share private data at certain times and within certain limitations or parameters. To implement these protections, service providers may implement a consent management system, which conventionally uses device and browser cookies to track user interactions and enforce consent. This leads to an inflexible data token, which also requires device-side storage of data (e.g., a browser cookie) that may violate newer laws and regulations (e.g., General Data Protection Regulation (GDPR) regulations). Thus, it is desirable for service providers to implement an automated system to manage consent authorizations and privacy protections without device-side data storage and through a more flexible consent management framework.

Figure 1:
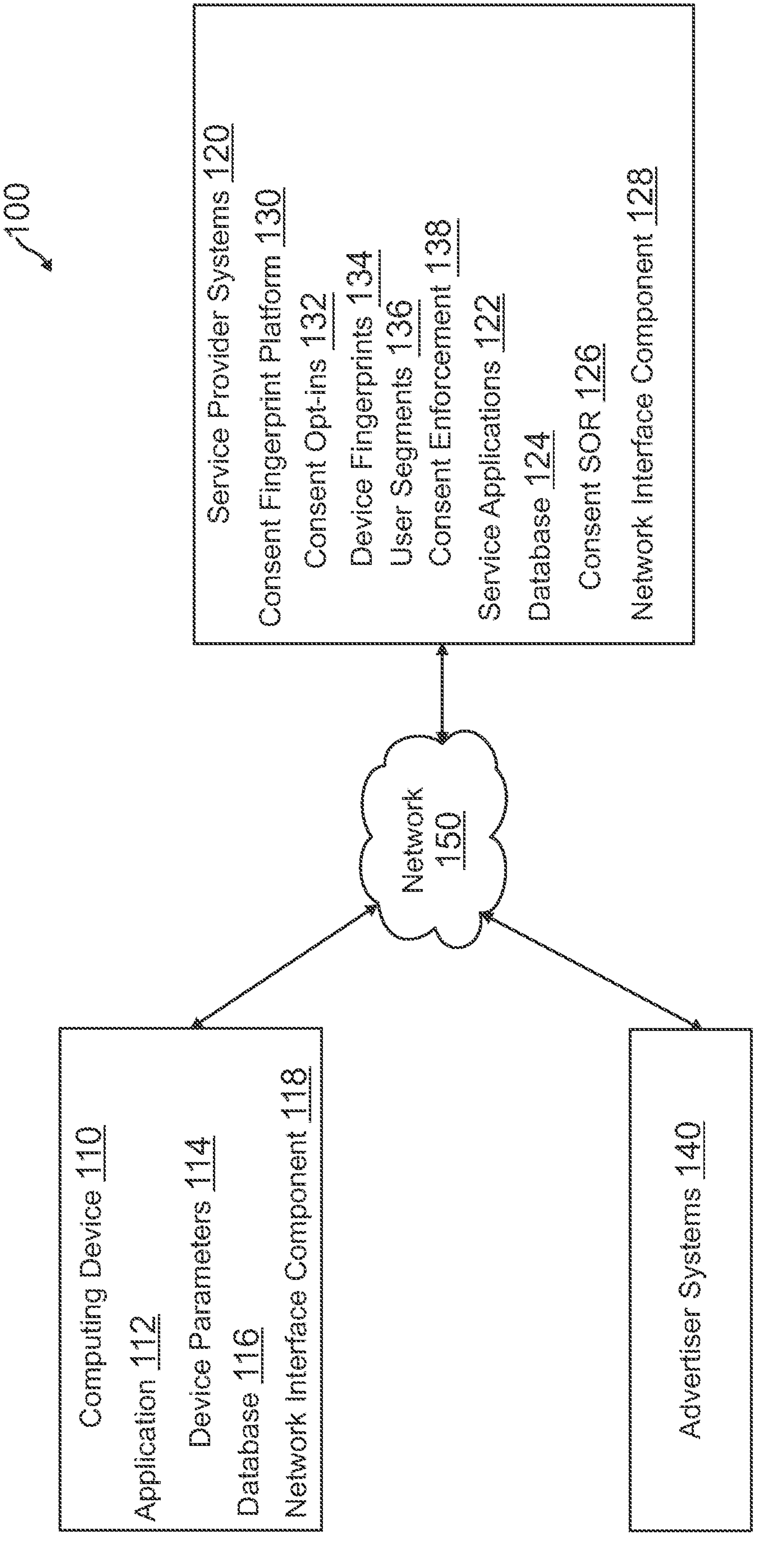
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a computing framework for enforcement of data privacy consent through device fingerprints. Systems suitable for practicing methods of the present disclosure are also provided.

When using computing platforms, applications, and websites of service providers, PII, KYC, privacy protected, and other personal, financial, or private data may be provided to the service provider by different users. For example, such private user data may be entered or uploaded during an account establishment or maintenance phase, while processing transactions or interacting with various computing services, users, or entities, and/or communicated via an email channel, a digital alert channel, a text message channel, a push notification channel, an instant message channel, or the like. To comply with data privacy protections, laws, rules, and regulations, the service provider may implement data security measures, and may further request consent and authorization to utilize the user data (e.g., for internal marketing, advertising, statistics and/or data research, etc.) and/or share the user data with other entities (e.g., consent "opt-in" or authorizations). Consents may also be opted-in within a set parameter or limitation, such as an amount or type of data usable or shareable, a length of permission of use/sharing, or other designation of the consent scope.

Consents by users may be recorded in data records, such as a system of records (SOR), which is used to manage and enforce those consents on sharing of data and protecting user data from being used, shared, or revealed. To provide consent management and enforcement without requiring the use of device-side data and cookies, the service provider may implement a server-side computing service digital platform that utilizes device fingerprints to track device usage and enforce consent authorizations and data privacy. The computing service may fingerprint a device providing a consent and linked to corresponding user data using device parameters, settings, features, and other data. The fingerprint may be a unique identifier for the device, such as a hash value or algorithmically created alphanumeric string created from different device parameters.

The device fingerprint may then be linked to the device, consent parameters and opt-in, and corresponding user data that may be shared and/or kept private and secured. Thereafter, the user data may be shared with internal services and/or other external and/or third-party entities in compliance with the given consent and linked to the device fingerprint. As such, when the device fingerprint is later detected, for example, when the device interacts with another application, website, and/or platform, the provided user data may be used for personalized interactions, content, advertisements, and the like. Third-party entities may be provided with the fingerprint for detection, as well as access to a software development kit (SDK), application programming interface (API), code packages, or the like where devices connecting to and/or interacting with their systems and platforms may be fingerprinted and/or matched to existing fingerprints. Further, when generating the device fingerprint, user segments for the user may be built, which may be used for advertising, marketing, and/or directed or personalized communications and/or data provided to the user in place of more generic content. As such, consents may be enforced without requiring device-side storage of data and through a more flexible system where consents may be opted-out, changed, and/or expired faster and with less changes of data and calls exchanged between systems. This may also prevent malicious actors and other users from breaching various computing systems and restricted data by circumventing security layers and required authorizations for data, content, and/or computing resources (e.g., applications, databases, data, operations, networks, etc.).

In this regard, a service provider, which may provide services to users including electronic transaction processing such as online transaction processors (e.g., PayPal®), may allow merchants, users, and other entities to process transactions, provide payments, provide content, and/or transfer funds between these users. The user may also interact with the service provider to establish an account and provide other information for the user. Other service providers may also or instead provide computing services, including social networking, microblogging, media sharing, messaging, business and consumer platforms, etc. In order to utilize the computing services of a service provider, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and the like.

The user may also be required to provide financial information, including payment card (e.g., credit/debit card) information, bank account information, gift card information, benefits/incentives, and/or financial investments, which may be used to process transactions for items. The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. In this regard, the transaction processor or other online service provider may offer and provide computing services through data processing of account and transaction data for electronic transaction processing, as well as other data processing services for other use of computing services on websites, applications, or other online portals of the merchant.

All of these interactions may generate and/or process data, which may be privacy protected by rule, law, policy, or regulation, and/or users may wish to protect such data. Further, the data accessed, stored, and/or utilized by the service provider may include privacy protected data, such as PII, financial data, health data, transaction data and/or histories, KYC data, and the like. As such, sharing of the data (e.g., for marketing, outreach, guided suggestions or offers, etc.) may be limited and require consent from users to share and utilize with others. Further, computing attacks, malicious and fraudulent behavior, and the like may compromise the security of digital accounts and corresponding privacy protected data including financial and personal data, which may lead to further protections of such data and corresponding consent and/or authorizations to use, share, and/or store.

In order to provide a more secure consent framework for management and enforcement of user consents, permissions, and authorizations to share data, the service provider may utilize device fingerprints with consent parameters for consent opt-ins by users to data sharing and use of personal user data (or other data associated with the user, including device data, application data, account data, etc.). Initially, a user may engage with the service provider, such as by establishing an account and/or using the account in the aforementioned manners, engaging with a website, application, or other digital platform, or the like. For example, behavioral data collection may occur when a user visits a website or uses an application, where interactions including page or interface visits, viewed products, shopping behavior, and the like may be tracked. Engagement with the service provider may generate and/or provide the user data to the service provider, where the service provider may then request a consent opt-in from the user. The consent opt-in may correspond to an option, request, or the like by the service provider to opt-in, or opt-out accordingly, to sharing and/or use of user data internally and/or with third-party service providers and/or advertisers. With the opt-in, consent parameters may be established, which designate what user data may be shared or used, for how long, with which internal or external platforms and/or entities, and the like.

Once established, the consent management and enforcement framework of the service provider may then generate consent records and store the consent records, such as in a database, data table stored in a data repository or data storage component, or the like. For example, a system of record (SOR) may correspond to one or more data tables of consent opt-ins and authorizations, corresponding consent parameters, user data and/or data records, and/or linked identifiers for the authorized consents for data sharing. In order to link the consents users so that the consents may be enforced on data sharing and/or use, the user may be required to be tracked using a device fingerprint. A device fingerprint may correspond to a unique identifier, such as a unique hash, alphanumeric identifier, or other uniquely generated string that "fingerprints" or creates a unique one-to-one correspondence to the user's device. As such, the device fingerprint may be generated using device parameters including a device make, a device model, a processor type, a screen resolution, a screen height and/or a screen width, an operating system, a browser type and/or a browser version, an Internet protocol (IP) address, and/or a media access control (MAC) address. A unique identifier creation algorithm, hashing algorithm, or other computational operation may be used to create the device fingerprint. In contrast to storing a cookie or other piece of device-side data on a device of the user, the device fingerprint may be used for uniquely identifying when the user is engaging with the service provider or another external service provider and/or platform by identifying the user's device when used for interactions and communications. Thus, the device fingerprint may be stored in association with the consent parameters and other SOR data.

Based on the user data for the user, such as behavioral data from past interactions (including browsing, shopping, and/or transaction histories) and/or established account, financial, or personal data, one or more user segments may be built and determined by the framework for the user. User segments may correspond to distinct groups or segments based on shared characteristics, and may be used to group by interests, demographics, locations, preferences, spending habits or histories, personas, hobbies, work or employment, or the like. One or more operations may be executed to perform segment building for the user, which may be used to correlate the device fingerprint, consent parameters, and the like to segments that may be used for targeted content, such as advertisements or marketing, specific communications, or other outreach that may be specific to the user and/or user's segments. Such operations for segment building may be rule-based, such as based on different grouping or segmenting rules from user data. Further, one or more neural networks (NNs), machine learning (ML) models, or other artificial intelligence (AI) systems may be used to group or cluster users, predict user behavior and/or segments, or the like. The segments may be built to obfuscate or hide the underlying user data that may be privacy protected or desirable to secure, and as such allow for targeted communications without revealing personal user data that may otherwise compromise the privacy or identity of the user and/or share sensitive data (e.g., financial data, personal data that may risk identity theft, etc.).

Thereafter, the framework may share the device fingerprint and user segments with one or more internal computing services and/or endpoints, as well as external third-party entities, service providers, and/or digital platforms. The device fingerprint and/or user segments may be stored device-side and/or with edge-based computing nodes and networks in order to allow the user to perform device identification, authentication, and consent enforcement through the user's device and/or with edge network nodes. For example, 5G cellular networks and the like may provide edge computing nodes for devices, servers, and the like that are regionally local to and/or located nearby the user so that data may be provided quicker and on-demand. Other edge-based computing architectures, systems, and protocols may also be used to provide edge-based storage and access to device fingerprints and/or user segments. Further, device-side storage may be used so that device fingerprints and/or user segments may be provided to enforce consents with new advertisers or other third parties. As such, the device fingerprint and/or user segments may also be distributed over one or more other networks, devices, and/or servers for use with consent management and enforcement.

In some embodiments, the user data may also be authorized to be shared directly based on the consent parameters. The user segments may be used for targeted communications and outreach, and the device fingerprint may be used to identify when the user interacts with an internal or external website, application, or another digital platform. In this regard, to identify the device via the device fingerprint, the service provider may provide and/or offer an SDK, API endpoints and/or specification, code packages, fingerprinting algorithm or operations, and the like, which may be used by internal and/or external websites, applications, and/or platforms to fingerprint interacting devices when detected. The service provider may also provide an API that may be internally or externally callable by other APIs and endpoints to fingerprint device parameters when received and return a fingerprint for comparison.

Thereafter, the fingerprint and user segments may be used for targeted, directed, and/or personalized communications and interactions by the service provider and/or third-party entities and platforms. Further, the consent management and enforcement framework may manage, update, and enforce changes to the consent parameter and/or opt-in (as well as opt-outs) over time. This may include updating the SOR, device fingerprint (e.g., based on changing or updated device parameters), and the like in the internal records and data tables of the service provider. The framework may also update, push changes to, or otherwise enforce changes to the user's established consent with third-party platforms and entities. The user may also utilize multiple devices, which may cause multiple device fingerprints to be generated and linked with an account. The multiple fingerprints may therefore be linked to the same user and their corresponding consents so that the consents may be managed and enforced through multiple devices.

Therefore, the service provider's system may provide an automated consent management and enforcement framework and system designed to identify and protect from exposure of privacy protected user data, as well as use of such user data within the confines and restrictions of user's selected and opted-in to consents and authorizations. This may be done without causing device-side data to be stored, complying with regulations while reducing data storage costs and security issues from device-side data storage. Further, users and device security measures may be further protected from having device-side data be stored on-device, which may risk malicious parties compromising and/or abusing such data. This allows for faster and more efficient consent enforcement for data privacy protection and sharing, while minimizing data storage by individual devices and data distribution over many different devices. By reducing the manual effort and providing an automated systems, computing resources may be reduced and exploits or vulnerabilities in consent management systems may be identified and fixed more quickly and efficiently. As such, an improved computing system and framework may provide efficient, optimizing, and secure data protection and privacy enforcement.

FIG. 1 is a block diagram of a networked system 100 suitable for implementing the processes described herein, according to an embodiment. As shown in FIG. 1, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110, a service provider server 120, and advertiser systems 140 in communication over a network 150. Computing device 110 may be utilized by a user, customer, or the like to access a computing service or resource provided by service provider server 120 and/or content provider systems 140, which may be provided via one or more applications, websites, and/or other digital platforms. Service provider server 120 may provide various data, operations, and other functions to via network 150. In this regard, service provider server 120 may provide a data privacy and consent management and enforcement framework to secure user data and provide data sharing/use based on consent opt-ins and parameters established by users. The shared user data, including user segments built on the user data, may be limited by consent parameters and may allow service provider server 120 and/or advertiser systems 140 to target communications, interactions, and other personalization (e.g., personalized content, interfaces, messages, and the like).

Computing device 110, service provider server 120, and advertiser systems 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented as a communication device that may utilize appropriate hardware and software configured for wired and/or wireless communication with service provider server 120, advertiser systems 140, and/or other devices and/or servers. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains an application 112, a database 116, and a network interface component 118. Application 112 may correspond to executable processes, procedures, and/or applications with associated hardware. In other embodiments, computing device 110 may include additional or different modules having specialized hardware and/or software as required.

Application 112 may correspond to one or more processes to execute software modules and associated components of computing device 110 to provide features, services, and other operations for a user over network 150, which may include accessing and/or interacting with service provider server 120 and/or advertiser systems 140, such as through applications, websites, and/or other platforms that may allow for personalized and/or targeted communications, marketing, and/or content. In this regard, application 112 may correspond to specialized software utilized by a user of computing device 110 that may be used to access a website or UI provided by service provider server 120 and/or advertiser systems 140 to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for a merchant), presenting the website information to the user, and/or communicating information to the website. However, in other embodiments, application 112 may include a dedicated application of service provider server 120 or other entity (e.g., a merchant and/or one or more of advertiser systems 140).

Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with service provider server 120. When using application 112, user data may be provided and/or generated, such as based on different interactions by computing device 110 with service provider server 120. In this regard, device parameters 114 may be provided in order to fingerprint computing device 110, as well as enforce consents opted-in to using computing device 110. As such, device parameters 114 may correspond to different device settings, data, information, configurations, and the like, which may be provided when computing device 110 interacts with an online platform (e.g., service provider server 120 and/or advertiser systems 140), as well as detected by such platforms.

In some embodiments, application 112 may be used to provide one or more interfaces to opt-in to consent and authorizations for data sharing, as well as change, manage, and update such consents by setting consent parameters. Application 112 may therefore provide one or more opt-in requests and/or authorizations, which may allow a user to set consent parameters and provide device parameters 114 for device fingerprints. Application 112 may therefore allow for fingerprinting of computing device 110 based on device parameters 114 during and/or after consent opt-in. Further, directed and/or targeted communications and other personalization may be output to the user via application 112 based on such fingerprints and consent opt-ins.

Computing device 110 may further include database 116 stored on a transitory and/or non-transitory memory of computing device 110, which may store various applications and data and be utilized during execution of various modules of computing device 110. Database 116 may include, for example, identifiers such as operating system registry entries, cookies associated with application 112 and/or other applications, identifiers associated with hardware of computing device 110, or other appropriate identifiers, such as identifiers used for payment/user/device authentication or identification, which may be communicated as identifying the user/computing device 110 to service provider server 120.

Computing device 110 includes at least one network interface component 118 adapted to communicate with service provider server 120 and/or other devices, servers, and endpoints. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide automated operations for consent management and enforcement through the use of device fingerprints. In this regard, service provider server 120 includes one or more processing applications which may be configured to interact with computing device 110, advertiser systems 140, and/or other internal and/or external computing services to provide consent management and enforcement through device fingerprinting, segment building, and data sharing. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a consent fingerprint platform 130, service applications 122, a database 124, and a network interface component 128. Consent fingerprint platform 130, service applications 122, and other applications on service provider server 120 may correspond to executable processes, procedures, and/or applications with associated hardware. In other embodiments, service provider server 120 may include additional or different modules having specialized hardware and/or software as required.

Consent fingerprint platform 130 may correspond to one or more processes and/or modules associated specialized hardware of service provider server 120 to provide a platform and framework to establish, enforce, and manage consent opt-ins and consent parameters to share user data, or data derived from such user data (e.g., user segments) through device fingerprints. In this regard, consent fingerprint platform 130 may correspond to specialized hardware and/or software used by service provider server 120 to provide a system to detect user interactions with applications, websites, and/or other digital platforms of service provider server 120 through device interactions, network communications, exchanged API calls, and the like. As such, computing device 110 may be detected as engaging with service provider server 120, which may include providing user data (e.g., during account establishment, transaction processing, and the like) and/or generating user data (e.g., through behavioral data tracking). In order to protect the user's privacy and enforce data privacy protections, consent fingerprint platform 130 may then request consent opt-ins 132 for sharing and/or using the user data. Consent opt-ins 132 may be used to establish consent parameters for the data sharing and/or use, which may designate the terms, conditions, and other limitations on the data sharing and use (e.g., what data, for how long, with which parties, for what services, advertisements, personalization, and/or communications, etc.). Collection of consent opt-ins 132 may be done through consent banners, such as a pop-up window or an application widget provided via an application or a website, which may identify options for data privacy for sharing purchasing information and browsing information with merchants.

For linking consent opt-ins 132 and their parameters to users, device fingerprints 134 may be generated. Device fingerprints 134 may be based on device parameters for devices that interact with service provider server 120 or a third party including advertiser systems 140. Such device parameters may be detectable over a network from the devices when interacting. As such, the device parameters to generate device fingerprints 134 may include a device make, a device model, a processor type, a screen resolution, a screen height and/or a screen width, an operating system, a browser type and/or a browser version, an IP address, a MAC address, or the like. Device fingerprints 134 may be generated using a fingerprinting algorithm, protocol, and/or operation, which may correspond to a data hashing process, unique identifier creation process, or the like. As such, device fingerprints 134 may be generated as unique identifiers, strings, alphanumeric codes, ML vectors in a vector space (e.g., based on n-degree of dimensionality for n features or attributes of the device parameters), or the like, which uniquely identify a corresponding device based on their device parameters. As such, computing device 110 may be fingerprinted using device parameters 114.

User segments 136 may then be built for the users based on the user data and designed to obfuscate or hide the direct user data (e.g., personal user information, financials, etc.) while providing sufficient details to provide directed or targeted marketing, advertisements, communications, and/or personalization. In this regard, user segments 136 may correspond to categories used to group one or more users based one or more shared characteristics. User segments 136 may therefore be built for users based on their user data and may allow for directed or targeted communications and personalization with various services provided to the user. In some embodiments, generate device fingerprints 134 and/or user segments 136 may utilize an AI model and/or engine, such as one or more AI or ML models, NNs, generative AIs, or the like. These models and/or networks may have trained layers based on training data and selected ML features or variables. For example, ML features or variables may correspond to individual pieces, properties, characteristics, or other inputs for an ML model and may be used to cause an output by that ML model once the ML model has been trained using data for those features from training data. ML models may be used for computation and calculation of model scores based on ML layers that are trained and optimized. As such, ML models may be trained to provide a predictive output, such as a score, likelihood, probability, or decision, associated with a particular prediction, classification, or categorization.

For example, ML models and/or NNs may include deep NNs (DNNs), MLS, large language models (LLMs), generative AI models, or other AI models trained using training data having data records that have columns or other data representations and stored data values (e.g., in rows for the data tables having feature columns) for the features. When building ML models and/or NNs, training data may be used to generate one or more classifiers and provide recommendations, predictions, or other outputs based on those classifications and an ML or NN model algorithm and architecture. The algorithm and architecture for the ML models and/or NNs may correspond to DNNs, ML decision trees and/or clustering, conversational AI models, LLMs, generative AI, and other types of AI, ML, and/or NN architectures. The training data may be used to determine features, such as through feature extraction and feature selection using the input training data. For example, DNN models may include one or more trained layers, including an input layer, a hidden layer, and an output layer having one or more nodes; however, different layers may also be utilized. As many hidden layers as necessary or appropriate may be utilized, and the hidden layers may include one or more layers used to generate vectors or embeddings used as inputs to other layers and/or models. In some embodiments, each node within a layer may be connected to a node within an adjacent layer, where a set of input values may be used to generate one or more output values or classifications. Within the input layer, each node may correspond to a distinct attribute or input data type for features or variables that may be used for training and intelligent outputs, for example, using feature or attribute extraction with the training data.

Thereafter, the hidden layer(s) may be trained with this data and data attributes, as well as corresponding weights, activation functions, and the like using a DNN algorithm, computation, and/or technique. For example, each of the nodes in the hidden layer generates a representation, which may include a mathematical computation (or algorithm) that produces a value based on the input values of the input nodes. The DNN, ML, or other AI architecture and/or algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node(s) to produce one or more output values for ML models that attempt to classify and/or categorize the input feature data and/or data records. Thus, when the ML models and/or NNs are used to perform a predictive analysis and output, the input data may provide a corresponding output based on the trained classifications.

By providing training data, the nodes in the hidden layer may be trained (adjusted) such that an optimal output (e.g., a classification) is produced in the output layer based on the training data. By continuously providing different sets of training data and/or penalizing the ML models and/or NNs when the outputs are incorrect, the ML models and/or NNs (and specifically, the representations of the nodes in the hidden layer) may be trained (adjusted) to improve its performance in data classifications and predictions. Adjusting of the ML models and/or NNs may include adjusting the weights associated with each node in the hidden layer.

Consent fingerprint platform 130 may then enforce consent opt-ins 132 based on device fingerprints 134 through consent enforcement 138. Consent enforcement 138 may include data sharing and use in line with the consent parameters for consent opt-ins 132, and may provide user segments 136 and/or authorized user data to internal and/or external computing services, platforms, and/or entities for use based on such consent parameters. This may include sharing user segments 136 with advertiser systems 140 for targeted advertisements and marketing, where such targeting may be done by detecting device interactions through detecting devices using device fingerprints 134. This process therefore does not require device-side cookies or data to be stored on devices, linking to personal user contact information (e.g., email address, phone number, mailing address, etc.), and other more invasive and risky consent authorizations and data sharing. Consent enforcement may be based on laws, rules, policies, or regulations on data sharing, such as those corresponding to general data protection regulation (GDPR) law, which may govern privacy protected data use and/or sharing. Consent management and enforcement for data privacy through device fingerprints is discussed further herein with respect to FIGS. 2-4 below.

Service applications 122 may correspond to one or more processes to execute modules and associated specialized hardware of service provider server 120 to process a transaction and/or provide other computing services to users. For example, service applications 122 may be used to process payments and other services to one or more users, merchants, and/or other entities for transactions, which may include communication of targeted and/or personalized communications, advertisements, marketing, interfaces, processing flows, account services, and other content based on user data and/or user segments built on such data. Such targeting and personalization may also be limited to and based on shared data and/or data made available based on consent opt-ins and their consent parameters. In this regard, service applications 122 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. The financial information may also be used to establish a payment account and provide payments through the payment account.

The payment account may be accessed and/or used through a browser application and/or dedicated payment application. Service applications 122 may be used to process a transaction, such as using an application/website or at a physical merchant location. In some embodiments, service applications 122 may further be used to provide rewards, incentives, benefits, and/or portions of a cost or price of a transaction based on the transaction being processed for a purchasable item. Service applications 122 may process the payment and may provide a transaction history for transaction authorization, approval, or denial. However, in other situations, service applications 122 may instead provide different computing services, including social networking, microblogging, media sharing, messaging, business and consumer platforms, etc. These computing services may be used by customers and users, such as through advertiser systems 140, and therefore those customers and users may receive directed, targeted, and/or personalized content and data based on consents to share and/or use user data, which may be provided based on detected device fingerprints. As such, service applications 122 may be interacted with by computing device 110 and used to received and/or detect device parameters 114 for device fingerprinting and consent enforcement for shared user data.

Service applications 122 as may provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to view and communicate information more easily. Service applications 122 may include additional connection and/or communication applications, which may be utilized to communicate information to over network 150.

Additionally, service provider server 120 includes database 124. Database 124 may store various identifiers associated with service provider server 120. Database 124 may also store account data, including payment instruments and authentication credentials, as well as transaction processing histories and data for processed transactions. Database 124 may store financial information and tokenization data, as well as transactions, transaction results, and other data generated and stored by service applications 122. Further, a consent SOR 126 may be stored by database 124, which may correspond to records for consent opt-ins 132 and consent parameters, which are linked to device fingerprints 134 and user segments 136 for data sharing and use with consent enforcement 138. Although database 124 is shown as residing on service provider server 120 as a database, in other embodiments, other types of data storage and components may be used including cloud computing storage nodes, remote data stores and database systems, distributed database systems over network 150 and/or of a computing system associated with service provider server 120, and the like.

Service provider server 120 may include at least one network interface component 128 adapted to communicate computing device 110, advertiser systems 140 and/or other devices, servers, and the like directly and/or over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices. In various embodiments, service provider server 120 may utilize network interface component 128 to communicate with one or more edge networks, edge storage nodes or systems, 5G or other cellular network, devices, and the like for distribution and storage of device fingerprints 134, user segments 136, and the like to provide consent management and enforcement.

Advertiser systems 140, which include more generalized content provider systems, may be maintained, for example, by an online service provider, advertiser, marketing strategist and/or marketing service, or the like which may provide a platform in which privacy protected user data may be used to provide targeted communications, such as advertisements or other marketing, and other personalization to users based on detection of devices through device fingerprints 134. As such, advertiser systems 140 may provide automated operations for conversing with customers or other end users of service provider server 120 through devices, where devices may be fingerprints and communications then targeted or personalized based on corresponding user data and/or user segments 136. In this regard, advertiser systems 140 includes one or more processing applications, which may be configured to interact with service provider server 120 and/or other devices or systems to provide targeted and personalized communications.

In this regard, advertiser systems 140 may include operations to fingerprint user devices and endpoints that interact with advertiser systems 140 or corresponding applications, websites, and/or servers. For example, service provider server 120 may provide an SDK, API endpoints and/or specification, code packages, fingerprinting algorithm or operations, and the like, which may be used for device fingerprinting. Advertiser systems 140 may receive consent records, such as those from consent SOR 126 from service provider server 120, which may include device fingerprints 134 linked to user segments 136 or other user data. The fingerprinting operations provided by or accessible from service provider server 120 may then be used to fingerprint interacting devices so that devices may be detected and linked to their corresponding ones of user segments 136 and/or other user data. Thereafter, customization and personalization or targeted communications including advertisements and other marketing may be sent to the devices based on user segments 136 and/or other user data.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
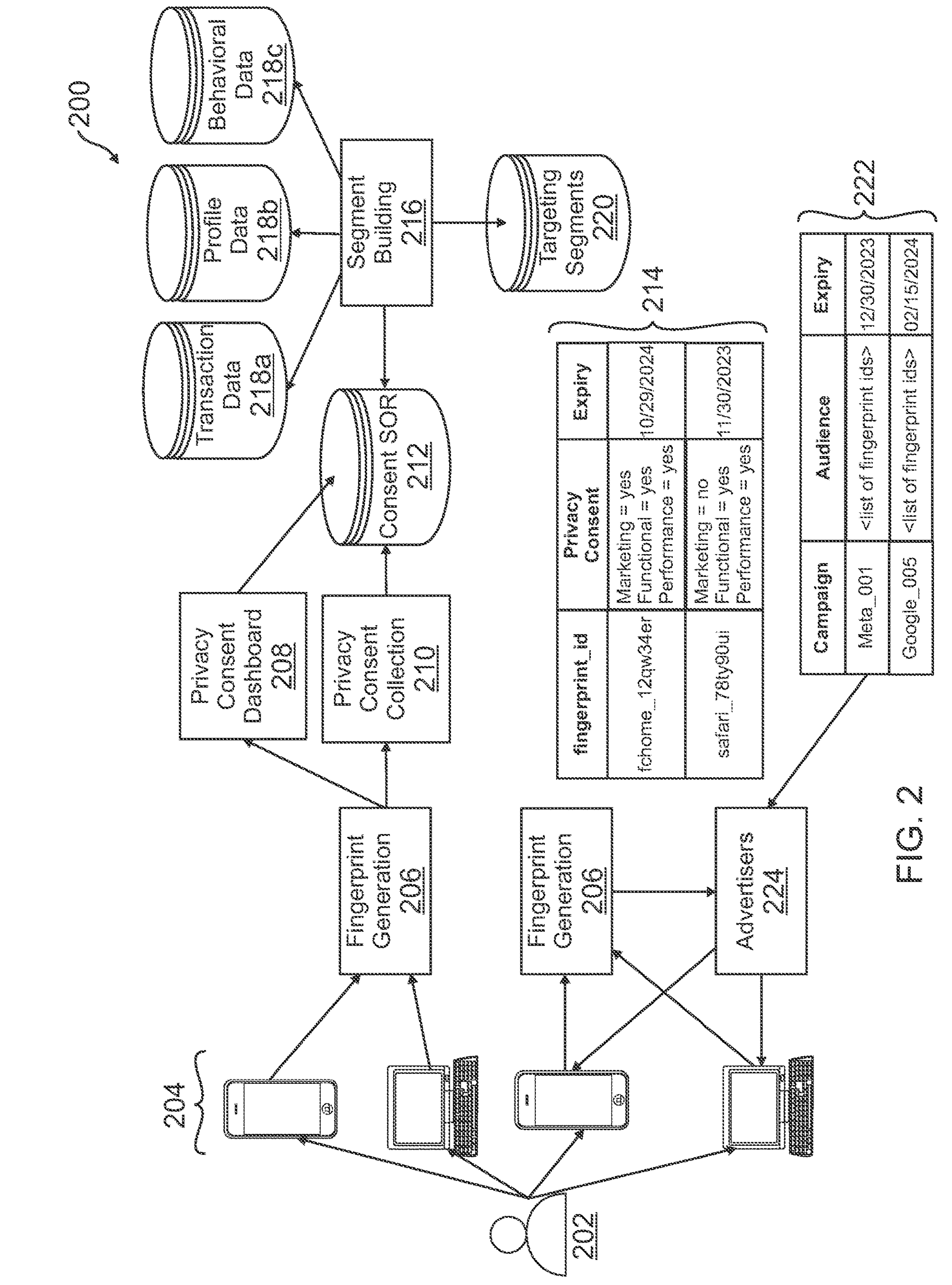
FIG. 2 is an exemplary system architecture for managing and enforcing data privacy consent through device fingerprints, according to an embodiment.

FIG. 2 is an exemplary system architecture 200 for managing and enforcing data privacy consent through device fingerprints, according to an embodiment. System architecture 200 may include components referenced with regard to system 100 of FIG. 1, such as the components of service provider server 120 interacting with computing device 110 and advertiser systems 140 over network 150. In this regard, system architecture 200 shows representations of device fingerprinting for consent management and enforcement with internal and/or external computing services and platforms.

In system architecture 200, initially a user interacts with various applications, websites, and other digital platforms provided by a service provider through devices 204. For example, different ones of devices 204 may access different available computing services and online digital platforms, where the user may interact with such services and platforms. User data may be provided and/or behavioral user data may be tracked, which may require consent for storage, sharing, and/or use. As such, devices 204 may be fingerprinted and corresponding consent to data sharing may be opted-in using the consent management and enforcement framework described herein. In this regard, fingerprint generation 206 may be performed to generate device fingerprints for devices 204, which may be created using device parameters unique and/or associated with each of devices 204. Fingerprint generation 206 may also utilize an identifier creation algorithm, hashing algorithm, NN or ML model, or the like to generate a unique representation of such device parameters for device fingerprints. Fingerprinting may occur by fingerprint generation 206 when devices 204 interact with the corresponding digital platforms.

Devices 204 may be directed to and/or interact with a privacy consent dashboard 208 and/or a privacy consent collection 210. For example, to opt-in to one or more consents to share data with other internal or external services that may provide targeted or personalized content and/or communications, devices 204 may be used to access privacy consent dashboard 208 and establish the opt-in while providing consent parameters to such opt-in. The consent opt-in may also be provided through privacy consent collection 210, such as one or more consent banners provided through interfaces and/or websites that may include pop-ups or other notifications displayable for the service provider to request consent and the user to provide a response to such request. Once the consent has been opted-in with corresponding parameter(s), the consent may be recorded with the device fingerprint from fingerprint generation 206 in consent SOR 212, such as a data table or other data structure(s). For example, consent records 214 include a fingerprint identifier, a privacy consent (e.g., consent parameter), and an expiry term. However, other fields and corresponding data may also be stored with consent records 214 for association with the device fingerprints and consent parameters.

For data sharing, data privacy may be maintained through the use of user segments and segment building from underlying user data that may include personal or financial data, which may be privacy protected and/or secured to prevent fraud and abuse. As such, segment building 216 may be performed using different data that may be tracked for a user, such as user data 218*a-c*. User data 218*a-c* includes transaction data, profile data, and behavioral data, however, other data may also be used for segment building 216. Segment building 216 may then generate user segments based on user data 218*a-c*, which may correspond to the categorizations and other characteristics used to describe, group, or identify a user and/or user characteristics without being required to reveal privacy protected data or other sensitive data. As such, segment building 216 may be used to generate targeting segments 220, which may link targeted communications and/or content based on corresponding user segments or "audiences."

For example, in a data table 222 for targeted advertisement campaigns, different advertisement campaigns may be linked to their corresponding audiences and an expiry of such advertisement campaigns. Thus, segment building 216 may be used to link user data 218*a-c* for targeted advertisement campaigns for consent records 214. As such, targeting segments 220 may be used to provide data from consent records 214 in consent SOR 212 to advertisers 224, which may then provide directed and/or targeted communications and content, such as advertisements, in association with targeting segments 220 and the campaigns in data table 222. For example, consent records 214 may be linked to the campaigns 222 in data table 222 so that advertisers 224 may receive information on how to market or what content to provide to users when device fingerprints from fingerprint generation 206 are detected and/or received.

Figure 3A:
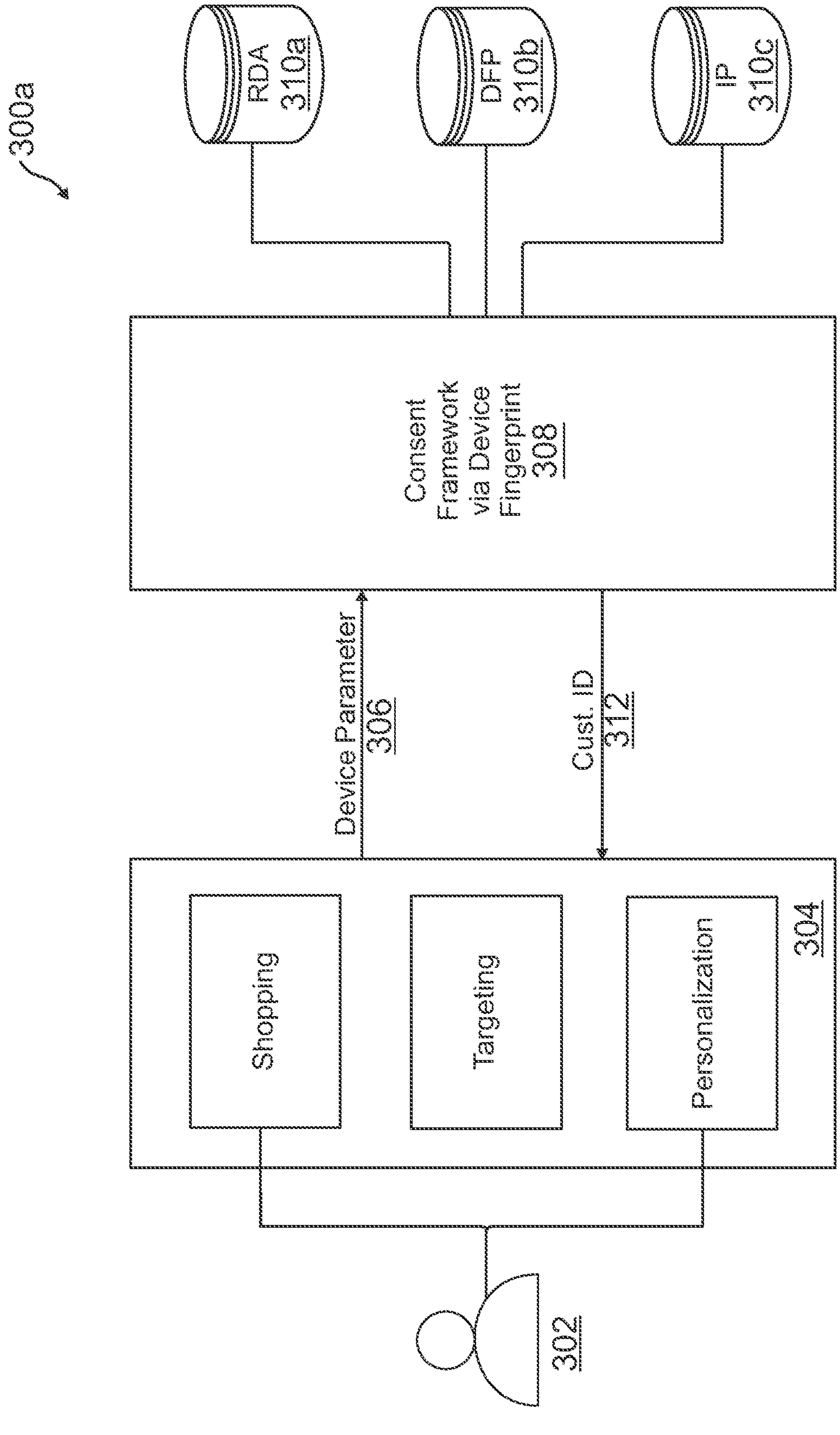
FIGS. 3A and 3B are exemplary diagrams of interactions with a device fingerprinting system for data privacy consent management and enforcement, according to an embodiment.
Figure 3B:
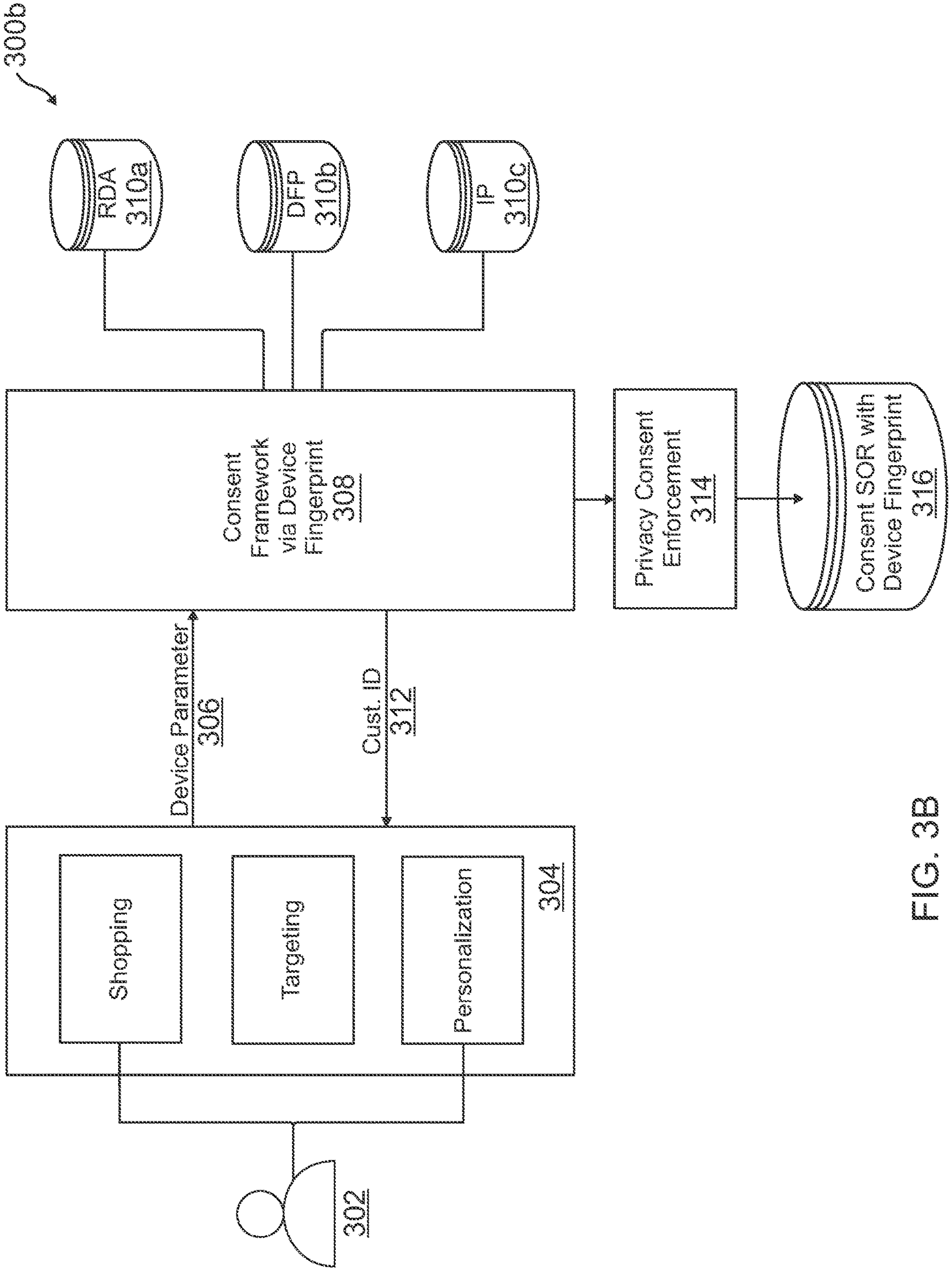

FIGS. 3A and 3B are exemplary diagrams 300*a* and 300*b* of interactions with a device fingerprinting system for data privacy consent management and enforcement, according to an embodiment. Operations or steps described in diagrams 300*a* and 300*b* of FIGS. 3A and 3B may be performed by a user 302 interacting with a service provider and/or platforms linked to the service provider, such as computing device 110 interacting with service provider server 120 in system 100 of FIG. 1. As such, user 302 may be provided consent management and enforcement through device fingerprints using an online service provider.

In diagrams 300*a* and 300*b*, user 302 may provide consents 304 for data sharing, including data for shopping, targeting (e.g., marketing), and personalization. As such, consents 304 may include consent parameters opted-in to by user 302. When opting-in to consents, a device parameter 306, such as an attribute or other information for the device used by user 302, may be provided to a consent framework 308 for device fingerprinting. Device fingerprinting by consent framework 308 may utilize data from RDA 310*a*, DFP 310*b*, and IP 310*c* for unique device fingerprinting and generation of a customer ID 312 for user 302 and their corresponding device.

In diagram 300*a*, customer ID 312 may then be linked to user data and distributed for data sharing based on consents 304. As such, customer ID 312 may be used to uniquely identify user 302 via their device when that device is used by user 302. However, in diagram 300*b*, a privacy consent enforcement 314 may be performed to generate data records in a consent SOR 316 that includes consents 304 associated with device fingerprints. As such, a database and enforcement mechanism may be provided to utilize consent SORs with device fingerprints to track consents 304 and enforce consents 304 across different service providers, platforms, and marketing campaigns.

Figure 4:
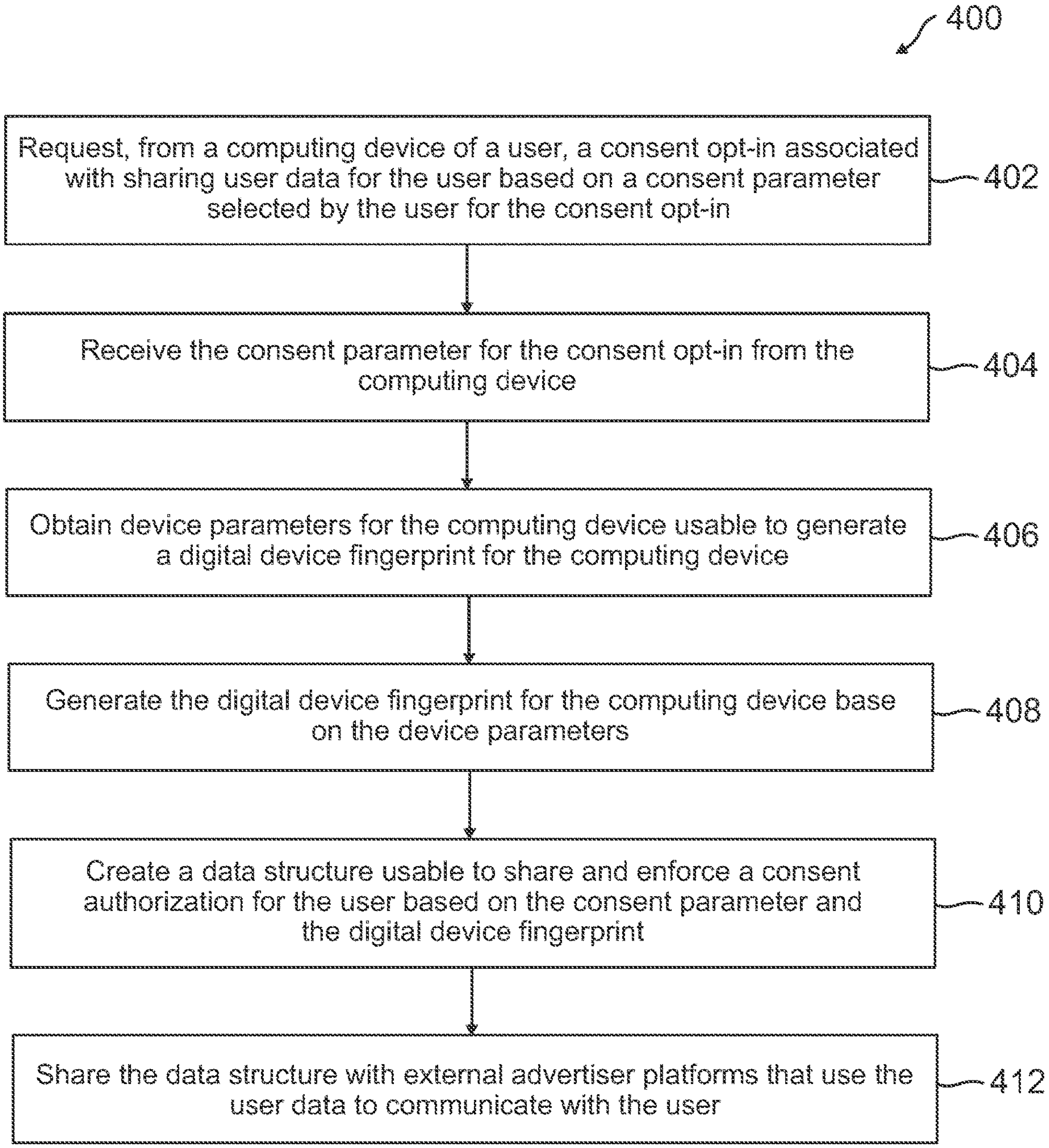
FIG. 4 is a flowchart for a computing framework for enforcement of data privacy consent through device fingerprints, according to an embodiment.

FIG. 4 is a flowchart 400 used by a computing framework for enforcement of data privacy consent through device fingerprints, according to an embodiment. Note that one or more steps, processes, and methods described herein of flowchart 400 may be omitted, performed in a different sequence, or combined as desired or appropriate.

Initially, at a step 402 of flowchart 400, service provider server 120, requests, from computing device 110 of a user, a consent opt-in associated with sharing user data for the user based on a consent parameter selected by the user for the consent opt-in. Computing device 110 may interact with service provider server 120 via an application, website, or other channel and/or online digital platform. Service provider server 120 may receive user data and/or track behavioral user data from the interactions, which may require a consent opt-in to store, share, and/or use, such as for marketing and/or targeted or personalized communications and content. Service provider server 120 may populate a consent opt-in request or option to computing device 110, such as though a consent banner that may be presented via a user interface in an application or on a website visited by computing device 110 (e.g., a pop-up window, an application widget, or a website banner/section).

At step 404, the consent parameter for the consent opt-in is received from the computing device. The user may opt-in to data sharing and/or use of user data, including user segments derived from the user data, with one or more internal services or platforms of the service provider, as well as external third-party service providers and entities (e.g., advertiser systems 140). As such, computing device 110 may provide to service provider server 120 one or more consent parameters that establish terms, conditions, and other limitations on the data sharing and use including what user data may be shared or use, for how long the data may be used, with which platforms or entities the data may be shared, for what services the data may be used, and the like.

At step 406, device parameters for the computing device usable to generate a digital device fingerprint for the computing device are obtained. When interacting with service provider server 120, computing device 110 may provide, or service provider server 120 may detect, device parameters 114 for computing device 110, which may be used to uniquely identify computing device 110 through determination and/or computation of a device fingerprint. In this regard, the device parameters may include a device make, a device model, a processor type, a screen resolution, a screen height and/or a screen width, an operating system, a browser type and/or a browser version, an IP address, a MAC address, or the like.

At step 408, the digital device fingerprint for the computing device is generated based on the device parameters. To compute the device fingerprint for computing device 110 based on device parameters 114, service provider server 120 may utilize a unique identifier creation algorithm, a hashing algorithm, or a mathematical model. In other embodiments, a NN, ML model, or other AI processing engine and/or model may be used to process input features associated with the device parameters and output a device fingerprint as a vector or other representation of the features, such as a vector of n dimensions represented in a vector space. As such, the digital device fingerprint may uniquely identify computing device 110 when such device parameters are detected. In other embodiments, the digital device fingerprint may have been previously generated and stored, such that the system may then access the previously generated digital device fingerprint.

At step 410, a data structure usable to share and enforce a consent authorization for the user is created based on the consent parameter and the digital device fingerprint. The data structure may correspond to a data record, such as a record (e.g., row of data), generated in a data table for consent SOR 126 stored by database 124 of service provider server 120. The data structure may include the consent parameter for data sharing, the device fingerprint, and the corresponding user data to be shared. The data structure may also be shareable, such as exportable, to one or more internal and/or external platforms or entities.

However, the user data may not be directly shared and may include privacy protected data. As such, a layer of abstraction to the user data may be provided by building and/or generating user segments for the user based on the user data, which may correspond to categories or characteristics of the user that may be used to group the user with other users, characterize the user, and/or personalize content for the user. Prior to and/or when generating the data structure, the user segments may be built for the user by grouping or clustering the user, using a NN or ML model to predict interests, categories, preferences, or characteristics of the user, and otherwise determining categorizations that describe the user. Such user segments may then be stored with the data structure in place of or with the corresponding user data for use when sharing and/or using data for prioritizations.

At step 412, the data structure is shared with external content provider platforms, such as advertiser platforms, that use the user data to communicate with the user. Based on the consent parameter, the user may authorize service provider server 120, advertiser systems 140, or other entity and/or platform to communicate with the user and provide personalized content to the user including advertisements and/or marketing. As such, the data structure may provide the device fingerprint needed for identifying the user when the user utilizes their user device to the external advertiser platforms or other internal/external platforms, as well as the user segment and/or user data needed for personalizing content for the user. Further, for other external service providers to fingerprint devices, service provider server 120 may also provide access to and/or information for the fingerprinting process to such external service providers.

Figure 5:
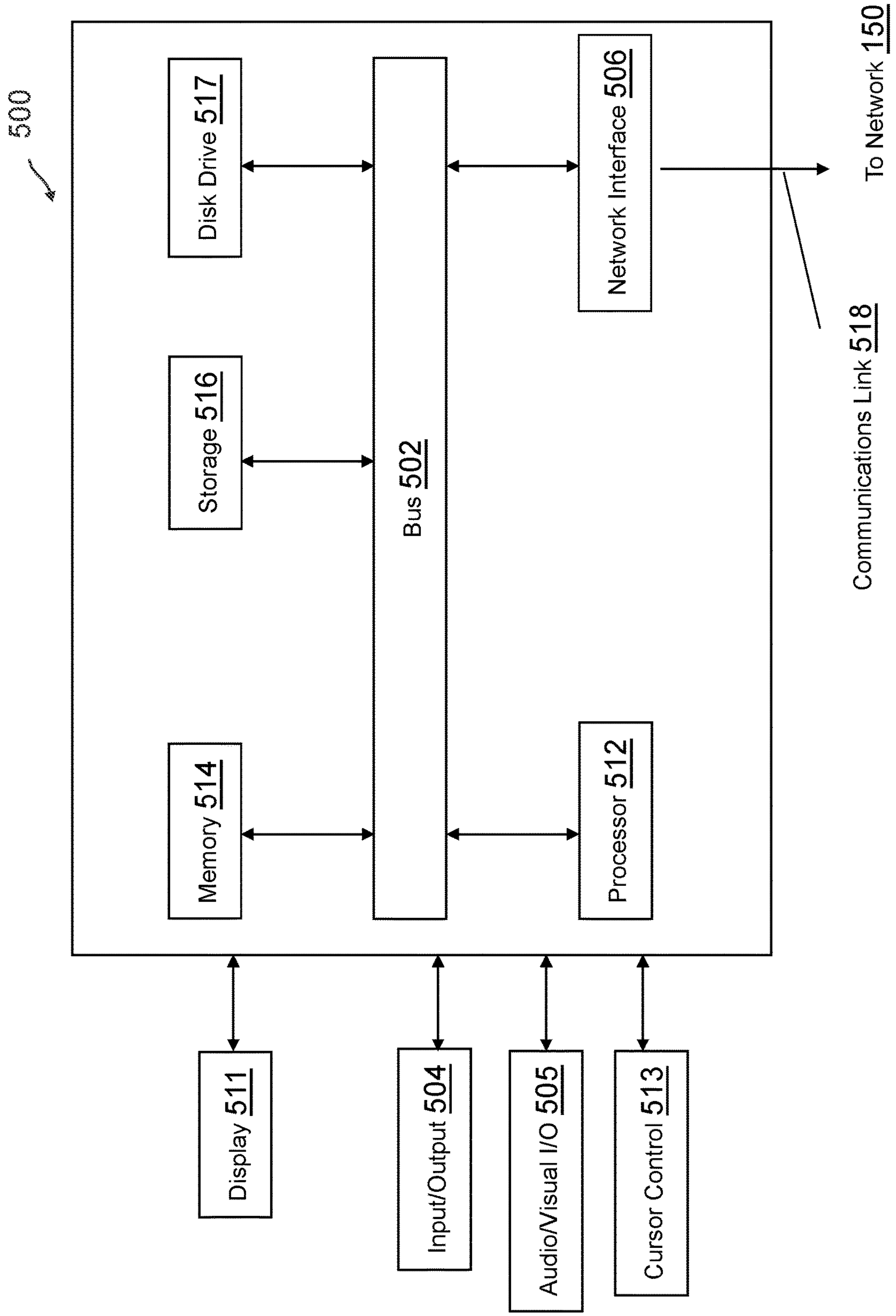
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:

a non-transitory memory; and one or more hardware processors coupled to the non-transitory memory and configured to execute instructions to cause the service provider system to:

detect a first interaction by a first computing device with a computing service that causes at least one of a receipt or a generation of user data for a user;

request a consent opt-in from the first computing device with at least the computing service, wherein the requested consent opt-in includes an option for a consent parameter associated with sharing the user data;

receive the consent parameter for the consent opt-in from the first computing device;

obtain a first plurality of device parameters for the first computing device;

generate a first digital device fingerprint for the first computing device based on the first plurality of device parameters;

store the consent parameter in association with the first digital device fingerprint in a server-side storage independent of a device-side storage of the first computing device, wherein the consent parameter is stored by a data structure usable for a shareable consent authorization for the user with a plurality of computing services including the computing service;

share the data structure with at least one data platform, wherein the user data is usable by the at least one data platform for communicating with the user;

receive one or more of the first plurality of device parameters from a third-party entity with a request for at least a portion of the user data;

generate an additional digital device fingerprint based on the one or more of the first plurality of device parameters;

identify the consent parameter based on a comparison between the additional digital device fingerprint and the first digital device fingerprint;

enforce the consent parameter on sharing the at least the portion of the user data with the third-party entity based on the request;

identify a second digital device fingerprint for a second computing device of the user based on a second interaction by the second computing device with one of the plurality of computing services, wherein the second digital device fingerprint is associated with a plurality of different device parameters of the second computing device; and link the second digital device fingerprint to the consent parameter using the data structure, wherein linking the second digital device fingerprint enables the consent parameter to be automatically enforced for additional user data associated with at least the second interaction by the second computing device.

2. The service provider system of claim 1, wherein, prior to sharing the data structure, executing the instructions further causes the service provider system to:

determine a user segment corresponding to the user, wherein the user segment is associated with targeted content for the user that are provided based on the user data and in accordance with the consent parameter, wherein the user segment is stored with the first digital device fingerprint in the data structure.

3. The service provider system of claim 2, wherein the user segment is determined based on the consent parameter and at least one of transaction data for the user, profile data for the user, or behavioral data for the user from the user data, and wherein the user segment is further associated with a campaign for the targeted content.

4. The service provider system of claim 1, wherein sharing the data structure comprises sharing, based on the consent parameter, at least a portion of the user data with the at least one data platform when the at least one data platform utilizes the at least the portion of the user data to communicate with the user.

5. The service provider system of claim 1, wherein the first plurality of device parameters comprise at least one of a device make, a device model, a processor type, a screen resolution, a screen height and/or a screen width, an operating system, a browser type and/or a browser version, an Internet protocol (IP) address, or a media access control (MAC) address.

6. The service provider system of claim 1, wherein executing the instructions further causes the service provider system to:

detect that the first computing device has accessed the computing service or another service provided by the service provider system using the first digital device fingerprint; and enforce the consent parameter on sharing of the user data during a use of the computing service or the other service.

7. The service provider system of claim 1, wherein executing the instructions further causes the service provider system to:

receive the first digital device fingerprint from a merchant; and share the user data with the merchant in accordance with the consent parameter.

8. The service provider system of claim 1, wherein the consent parameter is linked to the user using the first digital device fingerprint across computing services provided by the service provider system and the at least one data platform based on sharing the data structure.

9. The service provider system of claim 1, wherein the computing service comprises electronic transaction processing provided by the service provider system, wherein the consent opt-in is provided via a consent banner comprising one of a pop-up window or an application widget provided via one of an application or a website of the service provider, and wherein the consent opt-in is associated with data privacy for sharing purchasing information and browsing information with merchants corresponding to the at least one data platform.

10. A method comprising:

detecting a first interaction by a first computing device with a computing service of a service provider that causes at least one of a receipt or a generation of user data for a user;

receiving, from the first computing device, a consent opt-in by the user to a consent opt-in request via a privacy banner from the service provider, wherein the consent opt-in establishes a setting for a consent parameter for data privacy of the user data of the user accessible by the service provider;

detecting a first plurality of device parameters for the first computing device providing the consent opt-in, wherein the first plurality of device parameters are associated with at least one of software on the first computing device, a hardware configuration of the first computing device, or a network connection of the first computing device;

generating a first digital device fingerprint for the first computing device based on the first plurality of device parameters;

determining a user segment corresponding to the user based on the user data of the user and the consent parameter from the user for the consent opt-in;

receiving one or more of the first plurality of device parameters from one or more third-party digital platforms with one or more requests for at least a portion of the user data;

generating one or more additional digital device fingerprints based on the one or more of the first plurality of device parameters and the one or more requests;

identifying the consent parameter based on one or more comparisons between the one or more additional digital device fingerprints and the first digital device fingerprint;

enforcing the consent parameter with the one or more third-party digital platforms that provide content to the user in association with the user segment based on the one or more requests, wherein the enforcing includes sharing the user segment with the one or more third-party platforms in accordance with the setting for the consent parameter;

identifying a second digital device fingerprint for a second computing device of the user based on a second interaction by the second computing device with the computing service or another computing service of the service provider, wherein the second digital device fingerprint is associated with a second plurality of device parameters of the second computing device; and linking the second digital device fingerprint to the consent parameter, wherein linking the second digital device fingerprint enables the consent parameter to be automatically enforced for additional user data associated with at least the second interaction by the second computing device.

11. The method of claim 10, further comprising:

generating a data record for the consent opt-in with a consent system of records (SOR).

12. The method of claim 11, wherein the data record links the consent parameter to the first digital device fingerprint and the user segment.

13. The method of claim 10, wherein the consent parameter limits sharing of at least one of the user data or the user segment to an amount of time, a data type, or a receiver based on the setting.

14. The method of claim 10, wherein the user segment comprises a category associated with the user that is based on the user data and prevents revealing personal information or financial information in the user data.

15. The method of claim 10, wherein the generating the digital device fingerprint utilizes at least one of a unique identifier creation algorithm, a hashing algorithm, or a mathematical model.

16. The method of claim 10, wherein the generating the digital device fingerprint utilizes a machine learning model that generates a vector for the first digital device fingerprint based on features associated with the first plurality of device parameters.

17. The method of claim 10, wherein the first plurality of device parameters comprise at least one of a device make, a device model, a processor type, a screen resolution, a screen height and/or a screen width, an operating system, a browser type and/or a browser version, an Internet protocol (IP) address, or a media access control (MAC) address.

18. A non-transitory machine-readable medium having stored thereon machine-readable instructions executable to cause a machine to perform operations comprising:

detecting a first interaction by a first computing device with a computing service of a service provider that causes at least one of a receipt or a generation of user data for a user;

receiving a consent opt-in parameter from the first computing device of the user for data privacy of the user data of the user accessible by a service provider, wherein the consent opt-in parameter is received with a first plurality of device parameters for the first computing device providing the consent opt-in parameter;

accessing a first device fingerprint of the first computing device generated using the first plurality of device parameters;

generating, using the consent parameter and the first device fingerprint, consent enforcement data for an enforcement of the data privacy of the user data;

sharing the consent enforcement data with a digital platform of the service provider that communicates with the user when the first computing device is detected using the first device fingerprint, wherein the sharing enforces the data privacy of the user data in accordance with the consent parameter when the first device fingerprint is detected;

receiving one or more of the first plurality of device parameters from a third-party digital entity with a request for at least a portion of the user data;

generating an additional device fingerprint based on the one or more of the first plurality of device parameters;

identifying the consent parameter based on a comparison between the additional device fingerprint and the first device fingerprint;

enforcing the consent parameter on sharing the at least the portion of the user data based on the request;

identifying a second device fingerprint for a second computing device of the user based on a second interaction by the second computing device with the computing service or another computing service of the service provider, wherein the second device fingerprint is associated with a second plurality of device parameters of the second computing device; and linking the second device fingerprint to the consent parameter, wherein linking the second device fingerprint enables the consent parameter to be automatically enforced for additional user data associated with at least the second interaction by the second computing device.

19. The non-transitory machine-readable medium of claim 18, wherein the receiving the consent opt-in parameter includes detecting the first plurality of device parameters during an interaction by the first computing device with an application or a website of the service provider, and wherein the first plurality of device parameters comprise at least one of a device make, a device model, a processor type, a screen resolution, a screen height and/or a screen width, an operating system, a browser type and/or a browser version, an Internet protocol (IP) address, or a media access control (MAC) address.

20. The non-transitory machine-readable medium of claim 18, wherein the operations further comprise:

generating a data record for the consent opt-in parameter and the first device fingerprint with a consent system of records (SOR).

* * * * *